United States Patent [19]

Williams

[11] Patent Number: 4,758,605

[45] Date of Patent: Jul. 19, 1988

[54] STABILIZATION OF REACTIVITY OF POLYESTER POLYOL BASED POLYURETHANE FOAM COMPONENTS

[75] Inventor: David J. Williams, Wallingford, Conn.

[73] Assignee: The Dow Chemical Company, Midland, Mich.

[21] Appl. No.: 25,138

[22] Filed: Mar. 12, 1987

[51] Int. Cl.$^4$ .............................................. C08G 18/30
[52] U.S. Cl. ................................... 521/129; 521/130; 252/182.24
[58] Field of Search ................. 521/129, 130; 252/182

[56] References Cited

U.S. PATENT DOCUMENTS

| | | | |
|---|---|---|---|
| 2,842,506 | 7/1958 | Roussel | 260/2.5 |
| 2,886,555 | 5/1959 | Bunge et al. | 260/63 |
| 2,932,621 | 4/1960 | Terry | 260/2.5 |
| 3,239,480 | 3/1966 | Windemuth et al. | 260/31.2 |
| 3,767,602 | 10/1973 | Carroll et al. | 260/2.5 AC |
| 3,862,150 | 1/1975 | Bechara et al. | 260/268 T |
| 4,107,069 | 8/1978 | Keller et al. | 521/93 |
| 4,115,634 | 9/1978 | Bechara et al. | 521/126 |
| 4,421,673 | 12/1983 | Arbir et al. | 502/167 |
| 4,421,869 | 12/1983 | Arbir et al. | 521/126 |
| 4,456,696 | 6/1984 | Arbir et al. | 502/167 |
| 4,464,488 | 8/1984 | Zimmerman et al. | 521/115 |
| 4,467,089 | 8/1984 | Bechara | 544/351 |
| 4,617,286 | 10/1986 | Arai et al. | 521/129 |

OTHER PUBLICATIONS

Reaction Instability of Rigid Foam Systems Containing Polyester Polyols; De Guiseppi, D. T.; CPR Div., Dow Chemical, U.S.A., Torrance, Calif. 90509.

Primary Examiner—John Kight
Assistant Examiner—S. A. Acquah
Attorney, Agent, or Firm—J. S. Rose

[57] ABSTRACT

Disclosed are novel polyol blends comprising a polyester polyol, a tertiary amine polyurethane catalyst, and an organic carboxylic acid having a dissociation constant less than $1 \times 10^{-3}$ and which does not readily decarboxylate wherein the carboxylic acid is present in the proportions that its equivalent weight is at least equal to the equivalent weight of the tertiary amine. Also disclosed is the method for stabilizing blends of the above polyester polyols and tertiary amines by adding the carboxylic acid in at least equal equivalent weight to the amine present in the blend. Both polyurethane and polyurethane-polyisocyanurate foams prepared from the novel blends are also disclosed.

19 Claims, No Drawings 4,758,605

STABILIZATION OF REACTIVITY OF POLYESTER POLYOL BASED POLYURETHANE FOAM COMPONENTS

FIELD OF THE INVENTION

This invention relates to the stabilization of polyester polyols, more particularly polyester polyol blends with tertiary amine catalysts, process therefor, and foams prepared therefrom.

DESCRIPTION OF THE PRIOR ART

The reactions of polyester polyols with polyisocyanates in the preparation of polyurethane and polyisocyanurate cellular and non-cellular polymers has long been a well known and widely practiced art. With the advent of the economically attractive polyester polyols derived from such sources as crude dimethyl-terephthalate oxidate residues, recycled poly(ethylene terephthalates), and various scrap polyester sources, the use of polyester polyols has taken on added incentives. Aside from their low costs, these polyester polyols impart excellent flame retardancy characteristics to the resulting polyurethanes.

However, a serious problem has been encountered in respect of the stability of such polyols when stored as so-called B side components along with tertiary amine polyurethane and polyisocyanurate forming catalysts. The stability or loss thereof is reflected in the rise profile of the rising foam when the polyol reacts with the polyisocyanate A side component. The reason for the loss of reactivity has not been fully explained beyond conjecture. Suffice it to say the reactivity loss can vary from formulation to formulation, often from batch to batch of the same formulation. A foam system can become unacceptable for use after as little as one month of storage of the B side. This must be compared with the minimum required shelf life of six months for most B side components used in rigid foam systems. Very obviously the problem can be obviated by bringing together the reactants only when the final polymer foam is formed. Just as obviously, this defeats the economic and practical reasons for having A and B side ingredients as premixed components. Accordingly, there is a definite need for the solution to such a problem.

There are numerous references in the art to the use of organic carboxylic acid salts of tertiary amines either in the role of delayed action urethane catalysts or in conjunction with other catalysts for specific purposes. U.S. Pat. No. 2,842,506 discloses the use of such salts in conjunction with free tertiary amines in the formation of polyurethane foams from isocyanate terminated polyurethane prepolymers and water. U.S. Pat. No. 2,886,555 discloses coating, lacquer, adhesive, and stoving compositions containing blocked isocyanates, polyols inclusive of polyester polyols, and carboxylic acid salts of tertiary amines dissolved in solvents. Upon heating, the salts revert to their components so as to catalyze the urethane formation. U.S. Pat. No. 2,932,621 teaches the preparation of polyurethane foams having delayed reactivity by reacting a polyisocyanate with a polyester polyol blend containing the salt of a dicarboxylic acid and an excess, based on amine equivalents per equivalent of acid, of a hydroxyl containing tertiary amine. That is to say, the amine is always present in excess.

U.S. Pat. No. 3,239,480 discloses delayed action tertiary amine salt catalysts for the formation of polyurethanes from polyols in general and polyisocyanates wherein the catalyst is formed from the tertiary amine and a carboxylic acid having a dissociation constant greater than $1 \times 10^{-3}$ and which readily decompose by decarboxylation. The primary utilities are directed to castings, moldings, coatings, caulks, sealants, putties, adhesives, and the like. U.S. Pat. No. 3,767,602 purports to solve the problem of the breakdown of polyurethane tin catalysts when combined with tertiary amines by employing the formate or acetate salts of the tertiary amines. There is no distinction in regard to polyol types or even to polyol preblend, in this reference.

Assorted novel polyurethane catalyst salts of carboxylic acids with tertiary amines and combinations of such salts with other catalysts are disclosed in the U.S. Pat. Nos. 3,862,150; 4,115,634; 4,421,673; 4,456,696; 4,464,488; 4,467,089; and 4,617,286.

The preparation of polyurethane foams using the salt of N,N-dimethylaminopropane-1,3-diamine and phenol has been reported in U.S. Pat. No. 4,421,869.

None of the prior references recognized the problem nor were concerned with stability of polyester polyol blends in combination with particular tertiary amine carboxylic acid salts.

SUMMARY OF THE INVENTION

The present invention is directed to polyol blends comprising
A. a polyester polyol;
B. a tertiary amine catalyst;
C. an organic carboxylic acid having a dissociation constant less than $1 \times 10^{-3}$ and which does not readily decarboxylate: and
D. optionally a fluorocarbon blowing agent,
wherein said carboxylic acid is present in such proportions that its equivalent weight is at least equal to the equivalent weight of said tertiary amine.

The invention is also directed to a process for the stabilization of a polyol blend comprising a polyester polyol, a tertiary amine catalyst, and, optionally, a fluorocarbon blowing agent said process comprising adding to said blend a carboxylic acid in such proportions that its equivalent weight is at least equal to the equivalent weight of said tertiary amine and said carboxylic acid having a dissociation constant less than $1 \times 10^{-3}$ and which does not readily decarboxylate.

The invention is also directed to the polyurethane and polyurethane-polyisocyanurate foams prepared under foam forming conditions from an organic polyisocyanate, a polyol blend defined above, and, in the case of the polyurethane-polyisocyanurate foam, an isocyanate trimerization catalyst.

The term "polyester polyol" is meant to include any polyester polyol having a hydroxyl functionality of at least two wherein the majority of the recurring units contain ester linkages and the molecular weight is at least 400.

Although the components B and C of the above defined blends are listed separately for convenience, it will be readily understood that as soon as they come into contact with each other in said blends that immediate salt formation occurs.

Unexpectedly, the combination of carboxylic acid with the tertiary amine in at least equal equivalent proportions gives rise to the stabilization of the polyester blend for prolonged periods of storage including as long as six months and more under ambient conditions. In fact, the blends are stabilized even against elevated temperature conditions (for example at 50° C.). Accordingly, the polyester polyol blends of the present invention have solved the instability problem described above for polyester polyols in combination with tertiary amine catalysts.

Even more unexpected is the fact that the present blends, though they have all the tertiary amine in the form of salt, show the same catalysis for the isocyanate/hydroxyl reaction as if the free amine were present. The only proviso is that the amount of tertiary amine (in the form of the salt) is increased slightly over the level of amine in the absence of carboxylic acid. This discovery is most surprising in view of the fact the prior art teaches that amine carboxylic acid salts are primarily delayed action catalysts.

It is to be understood that the use of the term "equivalent weight" in respect of the acid and amine components means their molecular weights divided by their respective number of carboxylic acid groups and tertiary amine groups.

The blends of the invention are primarily useful for the preparation of polyurethane and polyurethane-polyisocyanurate foams by reaction with a polyisocyanate and other optional adjuvants discussed below. The foams produced therefrom find utility in the manufacture of foam bunstock material, pour-in-place foams, laminate foam sandwich material, spray foams, and the like.

Additionally, the present invention provides a facile method for preventing further degradation of polyester polyol blends already formed with the amine simply by adding the appropriate amount of acid to the blend.

DETAILED DESCRIPTION OF THE INVENTION

The polyol blends in accordance with the present invention are prepared simply by mixing the ingredients broadly defined above and in the absence of organic solvents using any convenient means for blending fluids and fluids with solids. Small scale preparations may be manually or mechanically stirred in conventional laboratory equipment such as beakers, flasks, reaction kettles and the like until a homogeneous blend is obtained. While no particular requirements are essential during the mixing procedure, it is preferred to exclude atmospheric moisture or the admission of water into the blend. This is preferably accomplished by carrying out the mixing under a positive inert atmosphere such as nitrogen, argon, and the like. Generally speaking, and, unless the base polyester polyol be of high viscosity, the mixing procedure is carried out under ambient room temperature conditions, for example 20° to 25° C. and can be accomplished literally in minutes. However, if the polyester is of high viscosity or other optional ingredients are present which are slow to intermix, then heating of the agitated mixture can be effected using any convenient means.

When the blends of the invention are to be prepared on larger commercial scales, then the above procedures are simply transferred to the appropriately sized and agitated kettles which are supplied and drained by pumps.

The resulting blends can be packaged and sealed in any suitable manner convenient to the size of the preparation and its intended use. Preferably, the packaging whether it be in bottles, drums, storage tanks, tank cars, or the like is carried out with reasonable precautions to exclude air and moisture and to provide a tight seal, thereby providing the optimum storage environment for the blend.

The sequence of addition of the blend ingredients is in no way critical to the benefits obtained and can be carried out in any order. Additionally, it has been observed that it matters not whether the carboxylic acid is added to the mixture of polyol and amine or whether the acid and amine be premixed first and added in the form of the salt. This is most convenient because it allows for the process (discussed below) for stabilizing already formed blends of polyester polyols and tertiary amines some time after their preparation.

The polyester polyol component in its broadest scope can be any polyester polyol defined above. Preferably, the polyol has a molecular weight from about 400 to about 10,000 and a hydroxyl functionality of from about 2 to about 6. Most preferably, the molecular weight falls within the range of about 1000 to about 6000 and a hydroxyl functionality of from about 2 to about 4.

Typical polyols include, e.g. reaction products of polyhydric (preferably dihydric) alcohols, optionally with the addition of trihydric alcohols, and polybasic carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic, and/or heterocyclic and they may be substituted, e.g. by halogen atoms, and/or may be unsaturated. Exemplary compounds include succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, dimeric and trimeric fatty acids such as oleic acid. Exemplary polyhydric alcohols include ethylene glycol, butylene glycol, hexanediol, octanediol, neopentyl glycol, cyclohexane dimethanol, 2-methyl-1,3-propanediol, glycerol, trimethylolpropane, hexanetriol, butanetriol, trimethylolethane, pentaerythritol, mannitol, sorbitol, methyl glycoside, diethylene glycol, triethylene glycol, dipropylene glycol, polypropylene glycol, dibutylene glycol, polybutylene glycols, and the like. Polyesters of lactones may also be used.

The polyester polyols referred to hereinabove derived from crude reaction residues and from scrap polyester resin sources provide particularly useful and preferred polyester polyol components for the present blends. This class of polyol is derived from the transesterification with a low molecular weight aliphatic glycol or mixture thereof of an aromatic ester selected from monomeric polyesters, oligomeric polyesters, polymeric polyesters, and mixtures of any of these in any proportions.

Preferred as a subclass within the above group are the polyester polyols derived from the so-called DMT (dimethylterephthalate) process residue by transesterification with a low molecular weight aliphatic glycol.

Typical DMT polyester polyols, for example, are disclosed in U.S. Pat. No. 3,647,759 which disclosure is incorporated herein by reference in its entirety and wherein the residue derived from DMT production via air oxidation of p-xylene is utilized. The oxidate residue contains a complex mixture of polycarbomethoxy substituted diphenyls, polyphenyls, and benzylesters of the toluate family. This residue is transesterified with an aliphatic diol such as ethylene glycol, propylene glycol, diethylene glycol, dipropylene glycol, and the like to produce a variety of low cost, predominately hydroxyl-functional polyester polyols with a wide variety of physical properties. Such DMT derived polyester polyols are produced under the name TERATE ® 200 series resin polyols. TERATE ® is a registered trademark owned by Hercules Incorporated, Wilmington, Del. As the viscosity of the product quasi-prepolymer is related, at least as a first approximation, to the viscosity of the DMT-derived polyester, those polyesters with lower viscosity are preferred. Suitable examples are TERATE ® 202, 203, and 204 resin polyols.

The DMT derived polyester polyols of the subject invention are all highly polar polyester polyols having a high weight percentage of aromatic character. Preferably, the hydroxyl number of suitable DMT derived polyester polyols is between 100 and 600, more preferably between 200 and 500, and particularly between 230 and 450.

The viscosities of suitable DMT derived polyols may vary considerably, but viscosities below about 20,000 cps at 25° C. are preferred. Generally, the lower the viscosity of the polyol, the lower the viscosity of the quasi-prepolymer, although other effects such as the average polyol or isocyanate functionality may cause the viscosity to vary. Most preferable, therefore, are those DMT derived polyols having low viscosities. Viscosities in the range of 10,000 to 18,000 cps, for example, are quite suitable.

Other illustrative but non-limiting examples of the aromatic ester based polyols are those derived from digesting polyalkylene terephthalate with organic diols and triols having a molecular weight from 62 to 500 as disclosed in U.S. Pat. No. 4,048,104 which disclosure relative thereto is incorporated herein by reference; the aromatic polyester polyols obtained from the reaction of polyethylene terephthalate residue with alkylene oxides in the presence of a basic catalyst as disclosed in U.S. Pat. No. 4,439,549 which disclosure relative thereto is incorporated herein by reference; the aromatic polyester polyols derived from recycled polyethylene terephthalate waste streams, alkylene glycols, and dibasic acid waste streams as disclosed in U.S. Pat. No. 4,439,550 and U.S. Pat. No. 4,444,918 which disclosures relative thereto are incorporated herein by reference; the aromatic polyester polycarbonate polyols derived from polyethylene terephthalate residues and alkylene carbonates as disclosed in U.S. Pat. No. 4,465,793 which disclosure relative thereto is incorporated herein by reference; the liquid terephthalic ester polyols derived from recycled or scrap polyethylene terephthalate and diethylene glycol and one or more oxyalkylene glycols as disclosed in U.S. Pat. No. 4,469,824 which disclosure relative thereto is hereby incorporated herein by reference; the polyester polyols made by first reacting recycled polyethylene terephthalate scrap with an alkylene glycol followed by reaction with an alkylene oxide as disclosed in U.S. Pat. No. 4,485,196 which disclosure relative thereto is incorporated herein by reference; the polyester polyols obtained by esterifying phthalic anhydride bottoms with aliphatic polyols as disclosed in U.S. Pat. No. 4,521,611 which disclosure relative thereto is incorporated herein by reference; the copolyester polyols comprising the reaction products of an aromatic component selected from phthalic derivatives, polyethylene terephthalate, or dimethyl terephthalate with dibasic acid compounds, at least one primary hydroxyl glycol, and at least small amounts of a secondary hydroxyl glycol as taught in U.S. Pat. No. 4,559,370 which disclosure is incorporated herein by reference; and the like.

The tertiary amine catalyst can be mixed with the polyester polyol in any proportions which will later act to provide the desired level of catalytic activity when the A side and B side are brought together to form the polyurethane and/or polyisocyanurate. It will be recognized that such proportions can vary considerably depending on such factors as the type of tertiary amine, the number of amine groups, and even the polyol itself.

Advantageously, the tertiary amine is present in the proportions of from about 0.01 to about 10 parts by weight per 100 parts of the polyester polyol component. Preferably, the amine is from about 0.5 to about 5 parts, most preferably from about 0.5 to about 3 parts per 100 parts of polyester polyol.

Any organic compound containing at least one tertiary nitrogen atom and which is capable of catalyzing the hydroxyl/isocyanate reaction can be used in the present blends. Typical classes of amines include the N-alkylmorpholines, N-alkylalkanolamines, N,N-dialkylcyclohexylamines, and alkylamines where the alkyl groups are methyl, ethyl, propyl, butyl, and the like and isomeric forms thereof; and heterocyclic amines. Typical but not limiting thereof are triethylenediamine, tetramethylethylenediamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, 2,4,6-tri(dimethylaminomethyl)phenol, N,N'N"-tris(dimethylaminopropyl)-sym-hexahydrotriazine, and the like, and mixtures thereof.

A preferred group of tertiary amines comprises bis(2-dimethylaminoethyl)ether, dimethylcyclohexylamine, N,N-dimethylethanolamine, triethylenediamine, triethylamine, 2,4,6-tri(dimethylaminomethyl)phenol, N,N',N"-tris(dimethylaminopropyl)sym-hexahydrotriazine, N-ethylmorpholine, and mixtures thereof.

In respect of the organic carboxylic acid component any acid meeting the above definition can be employed provided it does not contain carbon to carbon unsaturation. Organic polycarboxylic acids can be employed although monocarboxylic acids are preferred. The primary concern is that the proportion employed is such that its equivalent weight be at least equal to the equivalent weight of the tertiary amine present in the blend. While the acid may be employed in excess over the amine equivalents, it is not particularly desirable to do so. Excess acid can result in overall slowing of foam rise profile. As noted previously, the result of the interaction of the carboxylic acid group(s) with the amine(s) groups is the immediate formation of a salt.

A preferred class of acids is comprised of aliphatic monocarboxylic acids having 1 to 10 carbon atoms.

Illustrative but not limiting of the carboxylic acids are formic, acetic, propionic, butyric, caproic, 2-ethylhexanoic, caprylic, cyanoacetic pyruvic, benzoic, oxalic, malonic, succinic, adipic, azelaic, and the like and mixtures thereof. A preferred group comprises formic, acetic, and 2-ethylhexanoic acid, and mixtures thereof.

While the present blends in their broadest scope comprise only the components (A), (B), and (C) described above, in an optional embodiment, there is also present a fluorocarbon blowing agent. Although highly dependent on the type of polyester polyol, the presence of fluorocarbon can in some cases act to increase the degradation or destabilization process which occurs between polyester and amine in the blend. The presence of the carboxylic acid in accordance with the present invention acts to stabilize the blend reactivities even in the presence of the fluorocarbon.

Any amount of fluorocarbon may be present in the blended mixture. Generally speaking, the proportions are dictated by the desired foam densities of the final polyurethane foams produced therefrom. Advantageously, the proportions in parts by weight can fall within the range of from 0 to about 40 parts of fluorocarbon per 100 parts of polyol, preferably from about 4 to about 25 parts.

Illustrative of the fluorocarbon blowing agents are dichlorodifluoromethane, dichlorofluoromethane, trichloromonofluoromethane, methylene chloride, 1,1-dichloro-1-fluoroethane, 1-chloro-1,1-difluoro-2,2-dichloroethane, 1,1-difluoroethane, $C_4F_8$ cyclic Freon C-318, and mixtures thereof.

In addition to the above fluorocarbon blowing agents, the present blends also contemplate the presence of small proportions of water as additional blowing agents. Accordingly, water can be present in from zero to 2.5 parts by weight per 100 parts of polyester polyol.

Other optional embodiments of the present blends can include additional non-amine polyurethane catalysts in the proportions of from 0 to about 20, preferably 0.1 to 10 parts per 100 parts of polyester polyol. Typical of such catalysts are organometallic compounds of bismuth, lead, tin, titanium, iron, antimony, uranium, cadmium, cobalt, thorium, aluminum, mercury, zinc, nickel, cerium, molybdenum, vanadium, copper, manganese, zirconium, and the like. Included as illustrative examples are bismuth nitrate, lead 2-ethylhexoate, lead benzoate, ferric chloride, antimony trichloride, antimony glycolate: a preferred organo-tin class includes the stannous salts of carboxylic acids such as stannous acetate, stannous octoate, stannous 2-ethylhexoate, stannous laurate, and the like, as well as the dialkyl tin salts of carboxylic acids such as dibutyl tin diacetate, dibutyl tin dilaurate, dibutyl tin dimaleate, dioctyl tin diacetate, and the like.

Just as important as the additional non-amine polyurethane catalyst components, if not more so, are the blends of the invention additionally containing a trimerization catalyst for the purpose of converting the blends in conjunction with excess A side polyisocyanate to polyurethane-polyisocyanurate foams. The proportions of trimer catalyst can fall within the same ranges either in addition to, or in replacement of, the non-amine polyurethane catalysts set forth above.

The trimerization catalyst employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329: U.S. Pat. Nos. 3,745,133, 3,896,052, 3,899,443, 3,903,018, 3,954,684, and 4,101,465, the disclosures of these patent references being hereby incorporated by reference herein.

Typical catalyst classes are the glycine salts and tertiary amine trimerization catalysts and alkali metal carboxylic acid salts disclosed in the above patents and mixtures of the various types of catalysts. Preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

Other optional additives for the blends of the invention can include from zero to 20, preferably from about 2 to about 15 parts of a flame retardant such as tris(2-chloroethyl)phosphate, tris(2-chloropropyl)phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride, and the like, and mixtures thereof.

Dispersing agents, cell stabilizers, and surfactants can be incorporated into the present blends. Surfactants, better known as silicone oils, are added to serve as cell stabilizers. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

A feature of the present invention is the fact that having once formed a precursor blend of the polyester polyol and tertiary amine catalyst and optionally any of the above additional components but without the carboxylic acid component, the blend so formed can be stabilized from further activity loss simply by the method of adding the appropriate acid in at least equivalent acid proportions to the amine equivalents. Accordingly, a blend comprising a polyester polyol, a tertiary amine catalyst, and, optionally, a fluorocarbon blowing agent can be stabilized by adding to the blend a carboxylic acid as defined above. All of the preferred ingredients and proportions as applied to the blends discussed above also apply to this stabilization process.

In respect of the preparation of polyurethane foams using the polyester polyol blends of the invention described as B side components with a polyisocyanate A component under foam forming conditions, any of the methods well known in the art can be employed; for example, see Saunders and Frisch, Vols. I and II Polyurethanes Chemistry and Technology, 1962, John Wiley and Sons, New York, N.Y.: also see any of the U.S. patents referred to hereinabove regarding the prior art delayed action polyurethane catalysts and the assorted patents above relating to scrap polyester polyols which disclosures are already incorporated herein by reference. Accordingly, the polyurethane foams are readily prepared by bringing together the A and B side components either by hand-mix for small preparations and, preferably, machine mix techniques to form buns, slabs, laminates, pour-in-place, spray-on-coatings, froths, reaction injection molded bodies, and the like. Other ingredients besides those in the A and B components can be employed provided the B component comprises the minimum polyester polyol, tertiary amine and carboxylic acid as defined above. Optional ingredients such as fire retardants, other catalysts, even other polyols can be added in a third stream to the mix-head or reaction site. More conveniently, they are all incorporated into the one B side as set forth above.

The A component comprises the organic polyisocyanate and any other optional ingredients desired as for example additional blowing agent, surfactant, fire retardant, and the like, all as described above.

Any organic polyisocyanate used in polyurethane synthesis can be employed inclusive of aliphatic and aromatic polyisocyanates. Preferred as a class are the aromatic polyisocyanates. Typical aliphatic polyisocyanates are alkylene diisocyanates such as tri, tetra, and hexamethylene diisocyanate, isophorone diisocyanate, 4,4'-methylenebis(cyclohexyl isocyanate), and the like; typical aromatic polyisocyanates include m-, and p-phenylene diisocyanate, polymethylene polyphenyl isocyanates, 2,4- and 2,6-toluenediisocyanate, dianisidine diisocyanate, bitolylene diisocyanate, naphthalene 1,4-diisocyanate, bis(4-isocyanatophenyl)methane, bis(3-methyl-4-isocyanatophenyl)methane, and the like.

Preferred polyisocyanates are the polymethylene polyphenyl isocyanates, particularly the mixtures containing form about 30 to about 85 percent by weight of methylenebis(phenyl isocyanate) with the remainder of the mixture comprising the polymethylene polyphenyl polyisocyanates of functionality higher than 2.

The polyurethane foams produced can vary in density from about 0.5 pound per cubic foot to about 40 pounds per cubic foot, preferably from about 1.0 to about 20, most preferably, from about 1.5 to about 6 pounds per cubic foot. The density obtained is a factor of how much fluorocarbon blowing agent is already present in the polyester blend employed, or, alternatively, added at the time of the foam preparation.

The advantageous, and, unexpected feature of the present invention is the fact that the reactivity of the blend as measured by the rise profile of the forming cellular polyurethane, retains its activity over prolonged storage either at ambient conditions (20° C. to 25° C.) or even at higher temperatures. This allows for the handling, transportation and storage of the polyol blend ingredients together rather than the inconvenience of handling them separately.

If the B side blends employ as the sole urethane catalyst the tertiary amine, then in order to retain the same reactivity as their prior art counterpart blends without carboxylic acid (C), it is necessary to employ the tertiary amine in increased proportions over the normal levels. This is the only departure from the prior art procedures for the preparation of the polyurethanes. Advantageously, the tertiary amine must be added in excess parts by weight of from about 10 to about 100 percent, preferably, from about 20 to about 50 percent over normal levels. It should be emphasized that the total proportions of amine employed fall within the ranges set forth above in describing the blends of the invention and are completely neutralized by the at least equivalent proportions of carboxylic acid added. It should also be understood that if additional non-amine catalysts are employed, then excess proportions of the neutralized tertiary amine need not necessarily be present in order to maintain foam rise profiles similar to those formulations without acid.

In accordance with the prior art the overall proportions of A (polyisocyanate) to B (polyester polyol) is chosen such that the NCO:OH ratio falls within the range of about 0.85 to 1.10, preferably about 0.98 to 1.05. Additionally, as noted previously, other types of polyhydroxy components may be present such as polyether polyols, hydroxy terminated polybutadienes, polymer polyols, and the like, provided the major constituent is the polyester polyol of the B side blend.

In respect of the preparation of polyurethanepolyisocyanurate foams using the polyester polyol blends of the invention, any of the methods well known in the art can be employed; for example, see U.S. Pat. No. 4,237,238 which disclosure relative to polyisocyanurate foam preparation is incorporated herein by reference. All of the teaching described above for polyurethane preparation including types of products and ingredients and preferences thereof applies equally to the preparation of the polyisocyanurate containing foams, the only differences being the presence of the trimerization catalysts in the B components as a pre-blend, or, alternatively, added as separate streams to the A and B side reactants; also the excess of isocyanate over the hydroxyl so that polyisocyanate can trimerize to polyisocyanurate.

It will be understood by one skilled in the art that some trimerization catalysts will contain tertiary amine groups while others will not. Those containing the amine function are treated identically to urethane catalysts and can be used in addition to, or, as both polyurethane and trimer catalysts. If they have amine, they carry the same carboxylic acid equivalents in the B side blend. The proportions of trimerization catalyst are set forth above.

The proportions of A side to polyester polyol side B are such that the NCO:OH ratios fall with the range of from about 20:1 to 1.5:1, preferably from about 10:1 to 2:1, most preferably, 6:1 to 3:1.

As in the case of polyurethane formation, the B side polyol blends retain their reactivity as measured in the rise profiles of the foams prepared with aged blends compared with unaged blends. However, the measurement of rise profile is complicated by there being two rise profiles one first for polyurethane formation followed by the second for the trimerization. Notwithstanding, aged blends display the same reactivities as those freshly prepared.

The cellular foams prepared in accordance with the present invention find utility as thermal and sound insulation in home and building construction, pipe covering, storage tank insulation, and the like. The use of the aromatic polyester polyol mixtures, particularly the DMT residue derived polyols, provide polyisocyanurate foams characterized by high compressive strength, low friability, and excellent fire resistant properties arising from the formation of a protective layer of intumescent char upon unburned material. Additionally, the foams display low heat and smoke release upon burning.

The following examples describe the manner and process of making and using the invention and set forth the best mode contemplated by the inventor of carrying out the invention but are not to be construed as limiting.

EXAMPLE 1

This example describes the preparation of two stabilized polyester blends in accordance with the present invention set forth in Table I below under 1 and 2 as the component B. Their stabilities over a six month aging period are measured by their respective gel times during conversion into polyurethane foams using the polyurethane formulation also set forth in Table I and conventional hand-mix methods. A control blend containing only a tertiary amine catalyst as well as two comparison blends (comparison 1 and 2) are similarly prepared, aged, and tested as set forth in Table I.

The same general procedure is used in all five blend and foam preparations. Initially, in each case the "B" side blend is prepared by mixing the ingredients in the proportions of parts by weight set forth in Table I in a Tri-pour beaker and brought to a temperature of about 22° C. The proportion of dimethylethanolamine catalyst is selected in each case to give a gel time of 60±5 seconds at the initial foam preparation. This B blend is quickly added to the "A" component (at 22° C.) consisting of the polyisocyanate and fluorocarbon in the proportions of parts by weight set forth in Table I in a Tri-pour beaker. The ingredients are rapidly mixed for 15 seconds using a Conn 2 inch diameter mixing blade at 1750 r.p.m. and poured into an 11 inch×11 inch×11 inch cardboard box whereupon cream, initiation, gel, rise, and tack free times are observed for the polyurethane foam.

As noted in Table I, the control blend simply contains the 1 part of dimethylethanolamine catalyst and the foam is characterized by the initial reaction profile set forth therein. In blend #1 the dimethylethanolamine (0.013 amine equivalent) and an equivalent amount (0.013 acid equivalent) of 2-ethylhexanoic acid are added separately to the other B components. It should be noted that the tertiary amine level is increased by about 20 percent by weight over the control blend in order to achieve the requisite comparable gel time of 60 portioned out into 10 thoroughly dried one pint glass jars. The jars are sealed and stored at ambient temperature (i.e. 20° C.).

At the indicated time intervals set forth in Table I, a jar of the aged blend is reacted with freshly prepared A component in the same proportions in parts by weight set forth in Table I. The gel times for the polyurethane foams so formed are then determined.

It will be noted that in the case of blends 1 and 2, some six months after storage that their respective foam gel times are only 8 and 9 seconds longer than their zero time counterpart blends. Comparatively, the control blend is 38 seconds longer than its zero time counterpart while comparison blends 1 and 2 showed 37 and 41 second increases respectively over their base gel times. Clearly, the use of phenol in conjunction with the tertiary amine is no more effective in achieving any type of B component stability than is the control sample alone.

TABLE I

| Blend | Control | #1 | #2 | Comparison #1 | Comparison #2 |
|---|---|---|---|---|---|
| Ingredients (pts. by wt.) | | | | | |
| Component A: | | | | | |
| Polyisocyanate[1] | 81.9 | 81.9 | 81.9 | 81.9 | 81.9 |
| Monofluorotrichloromethane | 16.3 | 16.6 | 16.6 | 16.5 | 16.5 |
| Component B: | | | | | |
| Terate ® 203[2] | 100 | 100 | 100 | 100 | 100 |
| DC-193[3] | 1.5 | 1.5 | 1.5 | 1.5 | 1.5 |
| Dimethylethanolamine | 1.0 | 1.2 | 1.2 | 1.0 | 1.0 |
| 2-Ethylhexanoic acid | — | 1.9 | 1.9 | — | — |
| Phenol | — | — | — | 1.1 | 1.1 |
| Monofluorotrichloromethane | 10 | 10 | 10 | 10 | 10 |
| Initial Reaction Profile (minutes:seconds) | | | | | |
| Mix | 0:15 | 0:15 | 0:15 | 0:15 | 0:15 |
| Cream | 0:20 | 0:19 | 0:19 | 0:19 | 0:18 |
| Initiation | 0:22 | 0:22 | 0:22 | 0:22 | 0:21 |
| Gel | 0:59 | 1:01 | 1:00 | 1:00 | 0:59 |
| Rise | 1:23 | 1:25 | 1:20 | 1:22 | 1:23 |
| Tack Free | 1:24 | 1:22 | 1:23 | 1:19 | 1:15 |
| Aged Gel Times (Δgel sec.) | | | | | |
| 1 week | 1:11(12) | 1:04(3) | 1:02(2) | 1:06(6) | 1:08(9) |
| 1 month | 1:15(16) | 1:04(3) | 1:04(4) | 1:15(15) | 1:23(24) |
| 2 months | 1:20(21) | 1:04(3) | 1:06(6) | 1:22(22) | 1:22(23) |
| 3 months | 1:23(24) | 1:06(5) | 1:07(7) | 1:26(26) | 1:26(27) |
| 6 months | 1:37(38) | 1:09(8) | 1:09(9) | 1:37(37) | 1:40(41) |

Footnotes
[1]Polyisocyanate: A polymethylene poly(phenyl isocyanate) mixture containing about 40 percent by weight of methylenebis(phenyl isocyanate) with the balance of about 60 percent by weight being polymethylene poly(phenyl isocyanates) having a functionality greater than 2; isocyanate equivalent weight = about 133.
[2]Terate ® 203: Transesterified crude PMT residue supplied by Hercules Chemical Company, Wilimington, Delaware; hydroxyl equivalent weight = 175.
[3]DC-193: A silicone surfactant sold by Dow Corning Corporation; see "Dow Corning 193 Surfactant", Bulletin 05-146 February 1966.

seconds. Blend 2 of the invention differs from blend 1 only in that tertiary amine and carboxylic acid are premixed to form the amine-carboxylic salt prior to their addition to the other B components. This mode of addition is without effect on the initial reaction profile of the polyurethane foam. Comparison blends 1 and 2 differ from the invention blends 1 and 2 only in that the 2-ethylhexanoic acid is replaced in each case by an equivalent amount of phenol. Regardless of whether the two components are added separately (comparison 1) or preblended before addition to the polyester B blend (comparison 2), the polyurethane foam initial reaction profiles are identical to each other and to the foam rises for all the previous samples.

Master batches of each of the B blends are prepared by mixing the appropriate B components set forth in Table I in about 40 × the proportions therein in a lined 3 gallon pail. About 450 gram samples of the blends are

EXAMPLE 2

Using the same procedure and ingredients as set forth in Example 1 except as noted below in Tables II and III for the variation in amine and carboxylic acid component, there are prepared the stabilized polyester blends 3 to 10 in accordance with the present invention which are aged and then tested by conversion to polyurethane foams using the same A component as used in Example 1.

Again, the catalyst proportions are chosen to provide an initial foam gel time as close as possible to 60 seconds throughout the experiments. Instead of aging the blends at ambient temperature, accelerated aging is employed by storage of the blends at 50° C. under 20 psig for a two week period prior to foam testing.

Table II sets forth the blend series 3 to 6 wherein the tertiary amine component is dimethylethanolamine in all cases along with the equivalent amount of carboxylic acid component and all in the proportions to provide the gel time proximate to 60 seconds (blend 6 and comparison blend 3 are off). Obviously, the control blend is a repeat of the control formulation set forth in Table I above. The comparison 3 represents an unsaturated carboxylic acid not in accordance with the present invention.

Table III sets forth the blend series 7 to 10 all based on N,N-dimethylcyclohexylamine with the appropriate carboxylic acid along with the control containing no carboxylic acid and comparison blend 4 having an unsaturated carboxylic acid not of the invention.

The aged control blends show a 29 percent and 102 percent increase in gel times with dimethylethanolamine and dimethylcyclohexylamine, respectively. Comparison blends 3 and 4 are worse at 45 and 120 percent increase in gel time, respectively.

Aged blends 3 and 4 show literally no change in gel within experimental error while the less preferred dicarboxylic acids (blends 5 and 6) show gel time increases of 18 and 26 percent, respectively. The N,N-dimethylcyclohexylamine definitely exhibits lower aging stability compared with dimethylethanolamine as reflected in the greater increase in the gel times, particularly in the comparison of the control blends and comparison blends 3 and 4 of Tables II and III. However, aged blends 8 and 9 are within experimental error literally no different from the zero time blends 8 and 9. Again, the less preferred dicarboxylic acid (blend 10) shows the greatest blend instability.

EXAMPLE 3

Using the same procedure and ingredients as set forth in Example 1 except as noted below in Table IV for the variation in tertiary amine component, there are prepared the stabilized polyester blends 11 to 15 in accordance with the present invention which are subjected to the accelerated aging process set forth in Example 2. The aged blends are converted to polyurethane foams using all the same ingredients and proportions set forth in Table I above and the foam gel times noted. The catalyst proportions are chosen to provide the initial gel times of approximately 60 seconds. Each blend has its control blend not containing the carboxylic acid. The equivalent proportions in parts by weight of 2-ethylhexanoic employed in each of the blends 11 to 15 are set forth in Table IV in brackets after each one of the amine catalysts.

The initial gel times for all blends are reasonably similar. Upon aging the control blends are seen to dramatically increase, whereas the stabilized blends largely retain their initial activity. Although it will be noted that the aging effect is not constant with all amine-polyester combinations. For example, blend 13 containing the 2,4,6-tri(dimethylaminomethyl)phenol loses about 50 percent of its activity in spite of stabilization, while the unstabilized control loses 144 percent of its activity. Comparatively, both the control and blend 15 essentially retain their respective initial activities to the same degree after aging. Obviously, amine-polyester combinations vary in the destabilization depending upon amine structure and bascity.

TABLE II

| Blend | Control | #3 | #4 | #5 | #6 | Comparison #3 |
|---|---|---|---|---|---|---|
| Dimethylethanolamine (pts. by wt.) | 1.0 | 1.7 | 1.4 | 1.3 | 1.2 | 1.2 |
| Carboxylic acid (pts. by wt.) | | | | | | |
| Formic 90% | — | 0.9 | | | | |
| Acetic | | | 0.9 | | | |
| Malonic | | | | 0.8 | | |
| Adipic | | | | | 1.0 | |
| Maleic | | | | | | 0.8 |
| Gel time (secs.): | | | | | | |
| Initial | 62 | 53 | 64 | 65 | 76 | 73 |
| Accelerated Aging[1] | 80 | 54 | 62 | 77 | 96 | 106 |
| % Change | +29 | +1 | −3.1 | +18.5 | +26.3 | +45.2 |

Footnote
[1] Accelerated Aging: The B component blend is aged in a sealed metal can stored at about 50° C. and 20 psig environment for two weeks.

TABLE III

| Blend | Control | #7 | #8 | #9 | #10 | Comparison #4 |
|---|---|---|---|---|---|---|
| N,N—dimethylcyclohexylamine (pts. by wt.) | 0.7 | 1.5 | 1.2 | 1.0 | 1.1 | 0.9 |
| Carboxylic acid (pts. by wt.) | | | | | | |
| Formic 90% | — | 0.6 | | | | |
| Acetic | | | 0.6 | | | |
| 2-Ethylhexanoic | | | | 1.1 | | |
| Malonic | | | | | 0.5 | |
| Maleic | | | | | | 0.4 |
| Gel time (secs.): | | | | | | |
| Initial | 64 | 56 | 62 | 57 | 73 | 75 |
| Accelerated Aging | 129 | 47 | 61 | 58 | 106 | 165 |
| % Change | +102 | −16.1 | −1.6 | +1.8 | +45.2 | +120 |

TABLE IV

| Blend | Control | #11 | Control | #12 | Control | #13 | Control | #14 | Control | #15 |
|---|---|---|---|---|---|---|---|---|---|---|
| t-Amine (pts. by wt.): | | | | | | | | | | |
| DABCO ® 33LV[1] | 1.5 | 1.8 (1.5) | | | | | | | | |
| Triethylamine | — | | 0.7 | 0.9 (1.3) | | | | | | |
| 2,4,6-Tri(dimethyl-aminomethyl)phenol | | | | | 1.8 | 2.2 (3.6) | | | | |
| N,N',N"—Tris(dimethyl-aminopropyl)sym-hexahydrotriazine | | | | | | | 0.9 | 1.2 (3.1) | | |
| N—Ethylmorpholine | | | | | | | | | 2.6 | 3.1 (3.9) |
| Gel Time (secs.): | | | | | | | | | | |
| Initial | 59 | 60 | 59 | 65 | 62 | 68 | 57 | 56 | 57 | 59 |
| Accelerated Aging | 74 | 55 | 182 | 66 | 151 | 103 | 186 | 64 | 60 | 60 |
| % Change | 25.4 | −8.3 | 208 | 1.5 | 144 | 51.5 | 226 | 14.3 | 5.3 | 1.6 |

Footnote
[1]DABCO ® 33LV: Solution of 33.3 percent by weight triethylenediamine in dipropylene glycol; supplied by Air Products Corporation.

EXAMPLE 4

This example sets forth in Table V a comparison of the gel times for the polyurethane foams prepared from the ambient aged samples of blend 1 of the invention (also set forth in Table I of Example 1) with those gel times for the polyurethane foams identically produced to have the initial 60 second gel time but using a comparison blend #5. The latter is identical to the B blend set forth in Table I except that the dimethylethanolamine/2-ethylhexanoic acid combination is replaced by 2.1 parts of a urethane catalyst Polycat SA-102. The latter is a heat activated delayed action urethane catalyst (supplied by Air Products, Pennsylvania). It is the monocarboxylic acid salt formed from 2-ethylhexanoic acid and 1,5-diazabicyclo (5.4.0) undec-5-ene (commonly known as DBU) and having one free tertiary amine nitrogen in the resulting salt.

The comparison of the gel times for the two blends shows that the Polycat SA-102 does provide short term stability (up to 2 months) to the polyester polyol blend B component. However, over the course of the standard 6 month storage period, the blend #1 shows a clearly superior stabilizing effect as evidenced by its loss of only 13 percent activity versus 43 percent loss for comparison #5.

TABLE V

| Blend | #1 | Comparison #5 |
|---|---|---|
| Gel times (minutes:seconds) | | |
| Initial | 1:01 | 1:00 |
| 1 week | 1:04 | 1:00 |
| 1 month | 1:04 | 1:01 |
| 2 months | 1:04 | 1:05 |
| 3 months | 1:06 | 1:11 |
| 4 months | 1:07 | 1:17 |
| 5 months | — | 1:23 |
| 6 months | 1:09 | 1:26 |
| Δ gel after 6 months (secs.) | 8 | 26 |
| % change | 13.1 | 43.3 |

EXAMPLE 5

The following example describes the preparation of a stabilized polyester blend #16 in accordance with the present invention set forth in Table VI below as component B wherein there is sufficient carboxylic acid to complex with all of the amino nitrogen in both catalysts. Its stability under the accelerated aging process described in Example 2 is determined by the gel times of the polyurethane-polyisocyanurate foam formulation set forth in Table VI in the proportions of parts by weight and using the hand mix procedure described in Example 1 above. The foam is a 500 index one wherein the polyester polyol equivalent is 0.2 per equivalent of polyisocyanate.

Control blend and its foam differs from blend #16 by having no acid constituent. A comparison blend #16 does contain 0.25 parts of 2-ethylhexanoic acid which is sufficient to complex with only the amine proportion equivalent to the dimethylcyclohexylamine present.

The control and comparison #16 lose 45 and 34 percent of their original activity, whereas blend #16 shows no loss. It should be noted that the 90 second gel times in both initial and aged blends are a result of the two-rise profile characteristic of a polyurethane-polyisocyanurate foam. The 90 second period is a reflection of the maximum time to gel for the final isocyanate trimerization process. As best it can be determined, the urethane portion of the gel time is approximately 60 to 70 seconds.

TABLE VI

| Blend | Control | Comparison #16 | #16 |
|---|---|---|---|
| Ingredients (pts. by wt.) | | | |
| Component A: | | | |
| Polyisocyanate[1] | 133 | 133 | 133 |
| L-5340[2] | 1.0 | 1.0 | 1.0 |
| Monofluorotrichloromethane | 20.0 | 20.0 | 20.0 |
| Component B: | | | |
| Terate ® 203[3] | 35.8 | 35.8 | 35.8 |
| DC-193[4] | 0.7 | 0.7 | 0.7 |
| Trimerization Catalyst[5] | 9.78 | 9.78 | 9.78 |
| N,N—Dimethylcyclohexylamine | 0.22 | 0.22 | 0.22 |
| 2-Ethylhexanoic acid | — | 0.25 | 2.3 |
| Monofluorotrichloromethane | 5 | 5 | 5 |
| Gel time (secs.) | | | |
| Initial | 62 | 67 | 90 |
| Accelerated Aging | 90 | 90 | 90 |

TABLE VI-continued

| Blend | Control | Comparison #16 | #16 |
|---|---|---|---|
| % Change | 45.2 | 34.3 | 0 |

Footnotes
[1] Polyisocyanate: Described in Table I above.
[2] L-5340: Silicone surfactant for rigid foam; visc. = 1000 cstk (25° C.): see Union Carbide Bulletin F-42172A, October 1970.
[3] Terate 203: Polyester polyol described in Table I above.
[4] DC-193: Silicone surfactant described in Table I above.
[5] Trimerization catalyst: A 50% w/w solution of the sodium salt of an aromatic substituted amino acid in diethylene glycol.

I claim:

1. A polyol blend consisting essentially of
   A. a polyester polyol;
   B. a tertiary amine catalyst;
   C. an organic carboxylic acid having a dissociation constant less than $1 \times 10^{-3}$ and which does not readily decarboxylate; and
   D. optionally a fluorocarbon blowing agent,
   wherein said carboxylic acid is present in such proportions that its equivalent weight is at least equal to the equivalent weight of said tertiary amine.

2. A polyol blend according to claim 1 wherein said polyester polyol has a molecular weight of from about 400 to about 10,000 and a hydroxyl functionality of from about 2 to about 6.

3. A polyol blend according to claim 2 wherein said polyester polyol is derived from the transesterification with low molecular weight aliphatic glycol(s) of an aromatic ester selected from the group consisting of monomeric polyesters, oligomeric polyesters, polymeric polyesters, and mixtures thereof.

4. A polyol blend according to claim 3 wherein said polyester polyol is derived from DMT process residue by transesterification with a low molecular weight aliphatic glycol.

5. A polyol blend according to claim 1 wherein said tertiary amine is present in the proportions in parts by weight of from about 0.01 to about 5 parts per 100 parts of said polyester polyol.

6. A polyol blend according to claim 1 wherein said tertiary amine is selected from the group consisting of bis(2-dimethylaminoethyl)ether, dimethylcyclohexylamine, dimethylethanolamine, triethylene diamine, triethylamine, 2,4,6-tri(dimethylaminomethyl)phenol, N,N',N''-tris(dimethylaminopropyl)sym-hexahydrotriazine, N-ethylmorpholine and mixtures thereof.

7. A polyol blend according to claim 1 wherein said carboxylic acid is an aliphatic monocarboxylic acid having 1 to 10 carbon atoms.

8. A polyol blend according to claim 7 wherein said carboxylic acid is 2-ethylhexanoic acid.

9. A polyol blend according to claim 1 comprising from about 2 to about 40 parts by weight of fluorocarbon blowing agent per 100 parts of said polyester polyol.

10. A polyol blend according to claim 1 additionally comprising from 0 to about 20 parts of a nonamine catalyst.

11. A polyol blend according to claim 1 consisting essentially of the ingredients set forth in the following proportions in parts by weight:
    A. about 100 parts of a polyester polyol derived from DMT process residue by transesterification with a low molecular weight aliphatic glycol;
    B. from about 0.01 to about 5 parts of a tertiary amine catalyst;
    C. an aliphatic mono-carboxylic acid having 1 to 10 carbon atoms in at least equivalent acid proportions to said tertiary amine; and
    D. from about 2 to about 40 parts of a fluorocarbon blowing agent.

12. A polyol blend according to claim 11 wherein (B) and (C) are dimethylethanolamine and 2-ethylhexanoic acid, respectively.

13. A polyol blend according to claim 11 wherein (B) and (C) are N,N-dimethylcyclohexylamine and 2-ethylhexanoic acid, respectively.

14. A process for the stabilization of a polyol blend consisting essentially of a polyester polyol, a tertiary amine catalyst and, optionally, a fluorocarbon blowing agent said process comprising adding to said blend a carboxylic Acid in such proportions that its equivalent weight is at least equal to the equivalent weight of said tertiary amine and said carboxylic acid having a dissociation constant less than $1 \times 10^{-3}$ and which does not readily decarboxylate.

15. A process according to claim 14 wherein said polyester polyol is derived from DMT process residue by transesterification with a low molecular weight aliphatic glycol.

16. A process according to claim 14 wherein said carboxylic acid is an aliphatic monocarboxylic acid having 1 to 10 carbon atoms.

17. A process according to claim 16 wherein said acid is 2-ethylhexanoic acid.

18. A polyurethane foam prepared under foam forming conditions from an organic polyisocyanate and a polyol blend according to claim 1.

19. A polyurethane-polyisocyanurate foam prepared under foam forming conditions from an organic polyisocyanate, a polyol blend according to claim 1, and an isocyanate trimerization catalyst.

* * * * *

UNITED STATES PATENT AND TRADEMARK OFFICE
CERTIFICATE OF CORRECTION

PATENT NO. : 4,758,605                    Page 1 of 2
DATED      : July 19, 1988
INVENTOR(S) : David J. Williams It is certified that error appears in the above-identified patent and that said Letters Patent is hereby corrected as shown below:

ABSTRACT, Cover Page of Patent, lines 6 and 7, "equivalent weight is at least equal to the equivalent weight of the tertiary amine." should read -- equivalents be at least equal to the equivalents of the tertiary amine. --.
Column 2, lines 37 and 38, "equivalent weight is at least equal to the equivalent weight of said tertiary amine." should read -- equivalents be at least equal to the equivalents of said tertiary amine. --; lines 44 and 45, "equivalent weight is at least equal to the equivalent weight of said tertiary amine" should read
-- equivalents be at least equal to the equivalents of said tertiary amine --. Column 6, lines 49 and 50, "equivalent weight be at least equal to the equivalent weight of the tertiary amine" should read -- equivalents be at least equal to the equivalents of the tertiary amine --. Column 17, Claim 1, lines 23 and 24, "equivalent weight is at least equal to the equivalent weight of said tertiary amine." should read -- equivalents be at least equal to the equivalents of said tertiary amine. --.
Column 18, Claim 14, line 33, "carboxylic Acid in" should read -- carboxylic acid in --; Claim 14, lines 33 and 34, "equivalent weight is at least equal to the equivalent

UNITED STATES PATENT AND TRADEMARK OFFICE
CERTIFICATE OF CORRECTION

PATENT NO. : 4,758,605

DATED : July 19, 1988

INVENTOR(S) : David J. Williams

It is certified that error appears in the above-identified patent and that said Letters Patent is hereby corrected as shown below:

weight of said tertiary amine" should read
-- equivalents be at least equal to the equivalents of
said tertiary amine --.

Signed and Sealed this

Seventeenth Day of January, 1989

Attest:

DONALD J. QUIGG

*Attesting Officer*  *Commissioner of Patents and Trademarks*